US008027531B2

(12) United States Patent
Wilburn et al.

(10) Patent No.: US 8,027,531 B2
(45) Date of Patent: Sep. 27, 2011

(54) APPARATUS AND METHOD FOR CAPTURING A SCENE USING STAGGERED TRIGGERING OF DENSE CAMERA ARRAYS (75) Inventors: Bennett Wilburn, Vienna, VA (US); Neel Joshi, La Jolla, CA (US); Marc C. Levoy, Stanford, CA (US); Mark Horowitz, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 742 days.

(21) Appl. No.: 11/187,699

(22) Filed: Jul. 21, 2005

(65) Prior Publication Data
US 2007/0030342 A1    Feb. 8, 2007

Related U.S. Application Data (60) Provisional application No. 60/590,310, filed on Jul. 21, 2004.

(51) Int. Cl.
G06K 9/00 (2006.01)
G06K 7/00 (2006.01)
G06T 15/00 (2006.01)
H04N 13/02 (2006.01)
H04N 13/04 (2006.01)

(52) U.S. Cl. ........ 382/154; 382/103; 382/312; 345/419; 348/48; 348/51

(58) Field of Classification Search .............. 382/154, 382/103, 312; 348/47, 48, 51; 345/419
See application file for complete search history.

(56) References Cited

U.S. PATENT DOCUMENTS

| 5,157,499 | A |   | 10/1992 | Oguma et al. ............... 358/213 |
| 5,475,422 | A |   | 12/1995 | Mori et al. ...................... 348/48 |
| 5,495,328 | A | * | 2/1996  | Spence et al. ................ 356/121 |
| 5,517,236 | A |   | 5/1996  | Sergeant et al. ............. 348/143 |
| 5,659,233 | A |   | 8/1997  | Nashiki ......................... 318/440 |
| 5,675,377 | A |   | 10/1997 | Gibas ............................. 348/47 |
| 5,710,875 | A |   | 1/1998  | Harashima et al. ........... 345/419 |
| 5,974,159 | A | * | 10/1999 | Lubin et al. ................... 382/106 |
| 6,084,979 | A |   | 7/2000  | Kanade et al. ................ 382/154 |

(Continued)

OTHER PUBLICATIONS

Shechtman et al., "Increasing Space-Time Resolution in Video," European Conference on Computer Vision (ECCV), May 2002, pp. 753-768.

(Continued)

*Primary Examiner* — Kathleen Y Dulaney
(74) *Attorney, Agent, or Firm* — Lumen Patent Firm (57) ABSTRACT This invention relates to an apparatus and a method for video capture of a three-dimensional region of interest in a scene using an array of video cameras. The video cameras of the array are positioned for viewing the three-dimensional region of interest in the scene from their respective viewpoints. A triggering mechanism is provided for staggering the capture of a set of frames by the video cameras of the array. The apparatus has a processing unit for combining and operating on the set of frames captured by the array of cameras to generate a new visual output, such as high-speed video or spatio-temporal structure and motion models, that has a synthetic viewpoint of the three-dimensional region of interest. The processing involves spatio-temporal interpolation for determining the synthetic viewpoint space-time trajectory. In some embodiments, the apparatus computes a multibaseline spatio-temporal optical flow.

20 Claims, 4 Drawing Sheets

U.S. PATENT DOCUMENTS

| | | | |
|---|---|---|---|
| 6,097,394 A | 8/2000 | Levoy et al. | 345/419 |
| 6,154,251 A | 11/2000 | Taylor | 348/159 |
| 6,198,852 B1 | 3/2001 | Anandan et al. | 382/284 |
| 6,331,871 B1 | 12/2001 | Taylor | 348/38 |
| 6,487,304 B1 * | 11/2002 | Szeliski | 382/107 |
| 6,566,697 B1 * | 5/2003 | Fox et al. | 257/292 |
| 6,738,533 B1 | 5/2004 | Shum et al. | 382/299 |
| 6,831,643 B2 | 12/2004 | Aliaga et al. | 345/427 |
| 7,161,614 B1 * | 1/2007 | Yamashita et al. | 348/42 |
| 7,292,271 B2 * | 11/2007 | Okano et al. | 348/218.1 |
| 7,388,598 B2 * | 6/2008 | Lee et al. | 348/42 |
| 2004/0222987 A1 * | 11/2004 | Chang et al. | 345/419 |
| 2008/0225129 A1 * | 9/2008 | Viinikanoja et al. | 348/218.1 |

OTHER PUBLICATIONS

Carceroni and Kutulakos, "Multi-View Scene Capture by Surfel Sampling: From Video Streams to Non-Rigid 3d Motion, Shape & Reflectance", International Conference on Computer Vision 2001, pp. 1-8.

* cited by examiner

APPARATUS AND METHOD FOR CAPTURING A SCENE USING STAGGERED TRIGGERING OF DENSE CAMERA ARRAYS

RELATED APPLICATIONS

This patent application claims priority to U.S. Provisional Patent application 60/590,310 filed on Jul. 21, 2004 and hereby incorporated by reference.

STATEMENT OF GOVERNMENT SPONSORSHIP

This invention was supported in part by DARPA under grant Nos. F29601-01-2-0085 and NBCH-10300095, as well as by the National Science Foundation under contract No. 0219856. The U.S. Government has certain rights in the invention.

FIELD OF THE INVENTION

This invention relates generally to apparatus and methods for capturing a scene with an array of cameras, and more particularly for high-speed video capture. It also relates to improved apparatus and methods for processing video of dynamic scenes using an array of video cameras that are triggered to capture frames a staggered manner.

BACKGROUND ART

The use of separate video cameras for high-speed video capture and 3-dimensional scene or object reconstruction is known in the art. General information on multi-camera systems and associated image processing can be found in U.S. Pat. Nos. 5,475,422; 5,517,236; 5,675,377; 5,710,875; 6,084,979; 6,198,852.

Now, U.S. Pat. No. 5,157,499 to Oguma et al. discloses a high-speed video camera using solid-state sensors. This system does not scale to a large number of cameras and thus limits the highest achievable system frame rate. In addition, due to small number of cameras it suffers from rolling shutter distortion when capturing fast moving objects in the scene. This distortion cannot be corrected without having visible seams in the image.

E. Shechtman, et al., "Increasing space-time resolution in video" European Conference on Computer Vision (ECCV), May 2002 teach the use of multiple cameras and align to a plane, but they do not have control over triggering. As a result, they cannot guarantee a constant frame rate for the final sequence. More importantly, their formulation relies on overlapping exposure times, resulting in blurry images. They attempt to remove the blur (and increase the temporal resolution) by a regularized deconvolution. This operation is known to be ill-conditioned and is only marginally successful while being computationally intensive.

Some known methods for controlling trigger timing are discussed in U.S. Pat. No. 6,331,871, which teaches simultaneous triggering, U.S. Pat. Nos. 6,154,251 and 5,659,233, which also teach simultaneous capture. Other approaches to triggering of synchronized camera arrays with arbitrary offsets all use cameras with dedicated synchronization inputs. Some commercial technologies exist for creating phase-shifted copies of triggering or timing signals for different cameras. These do not, however, scale well to large numbers of cameras. Moreover, they require different synchronization signals for each camera.

Still other prior art methods use still cameras with a configurable delay between triggers. These methods, as practiced, e.g., by Manex Entertainment, apparently use a trigger signal that propagates from one camera to the next after some delay. Because of the delay between cameras the trigger must run serially through the entire array of cameras and as it does so, each delay adds some timing uncertainty in addition to the propagation time for the signal. More importantly, this system works only for still cameras, since video cameras usually run at constant frame rates. The Manex system cannot guarantee that, especially with large numbers of cameras and arbitrary delays. The time from one frame acquisition to the next is at least the time for the delay signal to traverse the entire camera array. More generally, these methods and systems are not designed to allow the user to derive arbitrary space-time trajectories after filming just once. They are only designed to capture one space-time arc, or simulate one high speed, moving camera.

Much work has been done on view interpolation for scenes at a single instant in time. For some general prior art teachings on view interpolation the reader is referred to U.S. Pat. Nos. 6,097,394 and 6,831,643.

Multiple cameras are used to capture frames from a finite number of viewing positions. For a static (non-moving) scene, one could also take several images from different viewing positions using the same camera. View interpolation methods create new visual outputs or pictures of the scene that appear to have been taken from virtual viewpoints other than the actual viewpoints of the cameras. These methods are often extended trivially to video by ensuring that all of the cameras are synchronized to trigger frame capture simultaneously such that all frames or images at a given instant in time represent the same "frozen" scene.

Spatiotemporal view interpolation methods create new images of a scene from virtual viewing positions or viewpoints and at times other than the actual times and positions corresponding to the captured frames or images. For example, using a synchronized 30 frames per second (fps) camera array (triggered simultaneously), view interpolation methods could be used to create images from viewpoints other than the viewpoint of any of the cameras, but at the same time instants as the captured images. Spatiotemporal view interpolation methods can create images at new times, too. Thus, in principle, videos can be created that appear to come from video cameras with higher frame rates than those actually used to capture the frames.

In U.S. Pat. No. 6,738,533 Shum, et al. describe a minimum sampling rate and a minimum sampling curve for image-based rendering. However, Shum provides no teaching on temporal sampling for image-based rendering.

Additional work on spatio-temporal view interpolation is described by S. Vedula, et al., "Spatio-temporal view interpolation", Eurographics Workshop on Rendering, 2002, pp. 65-75 and R. Carceroni and K. Kutulakos, "Multi-view scene capture by surfel sampling: From video streams to nonrigid 3d motion, shape & reflectance", International Conference on Computer Vision 2001. Both of these use cameras synchronized to trigger simultaneously, and both deduce structural and reflectance models for the scene. For static scenes, this is still a challenging vision problem that requires sophisticated computational methods that incorporate data from all or many images. For spatiotemporal view interpolation, they must also infer the motion of their scene models across time.

In view of the shortcomings of the prior art, it would be an advance in the art to provide an apparatus and method that provide for deliberately and precisely controlled camera arrays for capturing scenes in a format that is well-suited for processing. In particular, it would be desirable to provide for a frame capture staging for camera arrays so as to permit spatio-temporal interpolation and processing of new visual outputs with minimal computational load.

OBJECTS AND ADVANTAGES

In view of the above, it is an object of the present invention to provide an apparatus and method for deliberately and precisely controlling camera arrays, and in particular the triggering of frame capture in such arrays in a manner that is well-suited for processing. Specifically, it is an object of the invention to control the timing of frame capture in a manner that permits spatio-temporal interpolation and processing of new visual outputs with minimal computational load.

It is a further object of the invention to ensure that the apparatus and method provide for better sampling including spatio-temporal sample distribution, increased temporal resolution and ability to capture quicker or more complex motion events in the scene, and more particularly in a three-dimensional region of interest in the scene.

It is still another object of the invention to ensure that the apparatus is low cost, scalable to large arrays of video cameras and easy to implement.

These and other advantages and objects of the invention will become apparent from the ensuing description.

SUMMARY OF THE INVENTION

The invention concerns an apparatus and a method for video capture of a three-dimensional region of interest in a scene using an array of video cameras. The video cameras of the array are positioned for viewing the three-dimensional region of interest in the scene. Each camera has a viewpoint, such that the region of interest is seen from a set of viewpoints corresponding to the cameras making up the array. A triggering mechanism is provided for staggering the capture of a set of frames by the video cameras of the array. The apparatus has a processing unit for combining and operating on the set of frames captured by the array of cameras to generate a new visual output. The visual output has a synthetic viewpoint of the three-dimensional region of interest.

In accordance with the invention, the processing unit has a spatio-temporal interpolation unit. The unit is used for performing a spatio-temporal interpolation operation on the three-dimensional region of interest for generating the visual output. Because of the staggered capture of the set of frames, the spatio-temporal interpolation unit is able to perform various image processing functions in a computationally efficient manner. In one specific embodiment, the visual output generated with the aid of spatio-temporal interpolation unit is a high-speed video of the region of interest. In such high-speed video the synthetic viewpoint can move along an interpolated space-time trajectory efficiently calculated by the spatio-temporal interpolation unit. The synthetic viewpoint can be interpolated from the set of viewpoints of the video cameras to be in a spot where there is no actual video camera and at a time that does not correspond to the trigger time of any particular video camera. Such synthetic viewpoint is a virtual viewpoint. Alternatively, the synthetic viewpoint can correspond to a viewpoint that is selected from among the set of viewpoints of the video cameras. It should be noted that when the visual output is a high-speed video, it is advantageous to use a dense array of video cameras near the desired synthetic viewpoint. This allows one to achieve a single viewpoint approximation, and thus avoid blurring in the high-speed video that would be perceived by the viewer due to rapid movement of the synthetic viewpoint. If the synthetic viewpoint is to move, then a sparse array should be used.

Alternatively, when the visual output is a space-time structure and motion model, e.g., as used for analysis of the region of interest or a walk-through video, the array does not need to be dense, and may even be sparse. That is because virtual views obtained from widely varying locations of the synthetic viewpoint are desired.

In some embodiments of the invention, the spatio-temporal interpolation unit has an optical flow processor for computing or obtaining multibaseline spatio-temporal optical flow of the region of interest at any viewpoint. The multibaseline spatio-temporal optical flow is useful for interpolating new space-time views from the captured set of frames based on knowledge of geometrical relationship and triggering times of the video cameras in the array. In a preferred embodiment of the invention, the multibaseline spatio-temporal optical flow is broken down into two components: one due to scene depth per pixel and one due to scene motion per pixel.

A number of desirable adjustments can be made to the visual output of the apparatus of invention. In some embodiments the apparatus has a frame adjustment module for controlling or correcting the mechanics of frame capture by the cameras in the array. In a specific embodiment, the cameras have a rolling shutter and the frame adjustment module has a rolling shutter canceller for eliminating that effect. In another specific embodiment, the frame adjustment module has a frame timing adjuster to perform additional corrections of triggering times.

Although the triggering mechanism can be implemented in many ways, it is advantageous for it to have a signal delivery unit for delivering to the cameras just two signals; a trigger signal and a clock signal. In this manner each video camera belonging to the array is addressed by the same two signals, thus avoiding uncontrollable delays and extra hardware. In this embodiment the cameras preferably have a programmable phase delay $\Delta$ at which they trigger the capture of their frame. In a preferred embodiment each camera receives these two signals from a parent and resends them to one or more children, so only two signals are sent to each device.

According to the method of video capture of the invention, the array of video cameras is first positioned for viewing the three-dimensional region of interest in the scene from the corresponding set of viewpoints belonging to the cameras. The capture of the set of frames by the cameras of the array is staggered in time by using different phase delays for triggering frame capture by each camera. The set of frames is combined and operations are performed on it to generate the visual output with a synthetic viewpoint of the three-dimensional region of interest.

The method preferably includes spatio-temporal interpolation of the visual output. In some embodiments the interpolation is used for correcting or adjusting the visual output, such as canceling the effects of rolling shutters. In other embodiments, the interpolation includes obtaining new views corresponding to a spatio-temporal trajectory of the synthetic viewpoint. Preferably, however, the interpolation includes obtaining multibaseline spatio-temporal optical flow. In an embodiment where the visual output is a high-speed video of the region of interest the method also includes adjusting the staggering such that temporally successive frames are captured by spatially neighboring video cameras. This is done in order to prevent jarring motion of the viewpoint from frame to frame, which would be perceived as an artifact by a viewer. When the visual output is a space-time structure and motion model of the region of interest, or a video from a moving synthetic viewpoint it is not necessary to use a dense array, and the staggering is adjusted to obtain successive frames from non-neighboring cameras uniformly in space-time.

The capture of the set of frames is staggered with the aid of a triggering mechanism that provides a trigger signal and a clock signal. Preferably, staggering includes delivering the trigger signal and clock signal to each camera and introducing a phase delay Δ between successive frames of the set of frames captured by the cameras of the array. Preferably, the phase delay Δ is programmed in each video camera, such that it is constant for each particular camera but varies from camera to camera.

A detailed description of the preferred embodiments of the invention is presented below in reference to the appended drawing figures.

DETAILED DESCRIPTION

Figure 1:
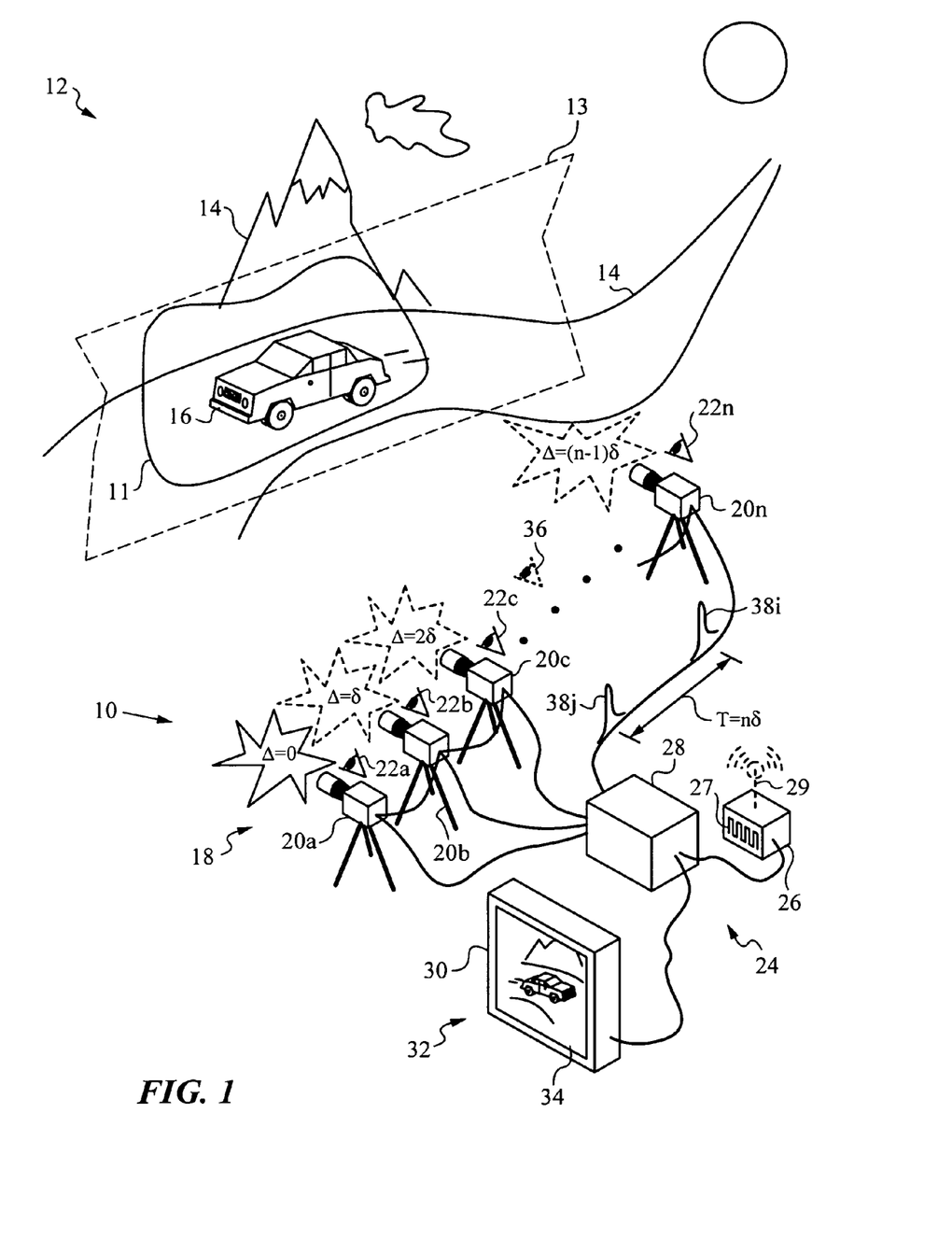
FIG. 1 is a schematic diagram illustrating a simplified apparatus for capturing a region of interest within a scene in accordance with the invention.

The present invention will be best understood by first reviewing FIG. 1, which illustrates a simplified schematic diagram of an apparatus 10 for capturing a three-dimensional region of interest 11 in a scene 12. Scene 12 contains static elements 14, here mountains and a road, as well as a dynamic element 16, in this case a moving car. Region of interest 11 contains dynamic element 16, i.e., the car, and its immediate surroundings. In the present embodiment, region of interest 11 is considered to be confined to a single object plane 13. It should be noted that using plane 13 is a simplifying assumption and represents only one albeit useful approach. Nonetheless, a person skilled in the art will recognize that other surfaces or geometrical assumptions about the location of region of interest 11 in scene 12 can be made.

Apparatus 10 has an array 18 of n video cameras 20a, 20b, . . . , 20n positioned for viewing region of interest 11 in scene 12. In the present embodiment video cameras 20a, 20b, . . . , 20n are arranged in a linear array 18, but it is understood that various other spatial arrangements including two-dimensional arrays can be used. Preferably, video cameras 20 are of the CMOS type.

Each video camera 20 has its own corresponding viewpoint 22a, 22b, . . . , 22n from which it captures region of interest 11 of scene 12. The centers of projection of the images of region of interest 11 as seen from different cameras 20, e.g., from adjacent video cameras 20b and 20c, are different. In general, the further spatially apart any two video cameras 20 are in array 18, the more misaligned are their centers of projection. This misalignment between centers of projection causes parallax.

In some applications, e.g., high-speed video, array 18 is dense in the sense that each video camera 20 is very close to its neighbors. The spatial separation between cameras 20 in a dense array is chosen such that their viewpoints 22 are sufficiently close to each other that frames captured by neighboring cameras appear to a viewer to come from essentially the same viewpoint. In the present embodiment producing a high-speed video of moving car 16 from synthetic viewpoint 36 requires a dense array (at least around the intended location(s) of synthetic viewpoint 36).

Apparatus 10 has a triggering mechanism 24 for staggering the capture of a set of frames by array 18 of video cameras 20. In the present embodiment triggering mechanism 24 has a global clock 26 and a signal delivery unit 28. Although global clock 26 is shown to deliver clock signal 27 via signal delivery unit 28, it is also possible to deliver clock signal 27 directly to cameras 20 either by a physical connection (not shown) or by a wireless connection 29 indicated in dashed lines. In other embodiments, cameras 20 may have their own internal synchronized clocks. A person of skill in the art will recognize that there are many ways to provide clock signal 27 for apparatus 10 and will appreciated how to adjust the configuration of apparatus 10 depending on the actual way in which clock signal 27 is generated and distributed. In one embodiment, triggering mechanism 24 employs a tree structure, such that each parent receives signals 26, 27 and resends them to at least one child.

Apparatus 10 is equipped with a processing unit 30 for combining and operating on the set of frames captured by video cameras 20 to generate a visual output 32. In the present case visual output 32 is a high-speed video of car 16 that is displayed on a display 34 of processing unit 30. In accordance with the invention, high-speed video 32 has a synthetic viewpoint 36; in other words, video 32 looks as if taken by a single camera from synthetic viewpoint 36.

To obtain high-speed video 32, video cameras 20 of apparatus 10 are synchronized and all operate at a frame rate s but their triggering is staggered in time by triggering mechanism 24. To accomplish this, triggering mechanism 24 can send out independent trigger signals 38i, 38j, . . . , 38q and clock signal 27 to video cameras 20 in array 18. Preferably, however, a single trigger signal 38 is sent once only and then apparatus 10 runs freely.

In the simplest case, trigger signal 38i received by last camera 20n of array 18 trigger the capture of successive frames without delay. Thus camera 20n captures at a frequency corresponding to its frame rate s without delay. In the preferred embodiment, however, all cameras 20 have a programmable phase delay Δ.

In the embodiment shown, phase delay Δ for camera 20n is Δ=(n−1)δ, where n is the number of cameras 20 in array 18. The phase delay for the other cameras is an integral multiple of δ starting with zero for camera 20a. Thus, spatially neighboring cameras 20 are each set to trigger at its particular phase delay Δ increasing by δ from left to right.

In other words, the triggering of frames in array 18 is staggered linearly from left to right. This is advantageous for obtaining a space-time structure and motion model of region of interest 11 in scene 12. Now, when visual output 32 is high-speed video the discontinuous spatial jump of synthetic viewpoint 36 caused by temporally successive frames being taken by cameras 20a and 20n is undesirable and a different temporal staggering order should be used. Specifically, the order should be such that temporally successive frames are preferably obtained from neighboring cameras 20.

A regular inter-frame delay δ is calculated from the period T, which is the reciprocal of frame rate s, divided by the number n of cameras 20 in array 18:

$$\delta = \frac{T}{n}.$$

In one exemplary embodiment the frame rate of video cameras 20 is F=30 Hz, n=100 and thus δ=1/3000 sec. Therefore, each one of cameras 20 of array 18 captures one frame during a period 1/30 of a second in rapid succession to yield a set of 100 frames. Thus, array 18 of cameras 20 triggered by mechanism 24 to stagger the capture of frames by a linearly increasing phase delay Δ produces a video 32 at an effective frame rate h of 3000 Hz with synthetic viewpoint 36 moving linearly from left to right and then jumping back to the left.

For the purposes of the present invention, we refer to array 24 operated with phase delays as a synchronized array with temporal phase delays (sometimes also referred to as phase offsets) or staggered. Note that inter-frame delay δ between successive cameras 20 does not need to be equal, as long as array 18 remains synchronized. In this condition each period T or cycle will yield a set of frames captured in a linear spatial succession from cameras 20 at non-regular, yet still predetermined phase delays Δ between cameras 20.

Of course, other spatial staggering schemes are possible. These can be accomplished by programming phase delays Δ of cameras 20 to effectuate triggering and frame capture in a non-linear sequence that skips between cameras 20 in array 18. In any case, however, it is advantageous that signal delivery unit 28 of triggering mechanism 24 needs only send two signals to cameras 20; clock signal 27 and trigger signal 38.

During operation, apparatus 10 generates a set of frames from cameras 20 during each period or cycle T. The frames are captured successively by spatially neighboring cameras 20 from left to right of array 18 and then a discontinuous jump occurs at the end of cycle T from the frame captured by camera 20n to the frame captured by camera 20a. Processing unit 30 combines and operates on the set of frames captured by video cameras 20 to generate visual output 32. In the present case output 32 is a space-time structure and motion model of moving car 16 within region of interest 11. The combining and operating of processing unit 30 is performed such that car 16 appears to be seen from synthetic viewpoint 36 moving along array 18 from left to right. When visual output 32 is a high-speed video of car 16, then a different staggering order is desirable. Specifically, the staggering order should ensure that temporally successive frames are taken by spatially neighboring cameras 20 to the extent possible to avoid discontinuous movement of synthetic viewpoint 36. For example, an appropriate staggering for nine cameras 20 (n=9) would be: 1, 2, 9, 3, 4, 8, 5, 7, 6.

Figure 2:
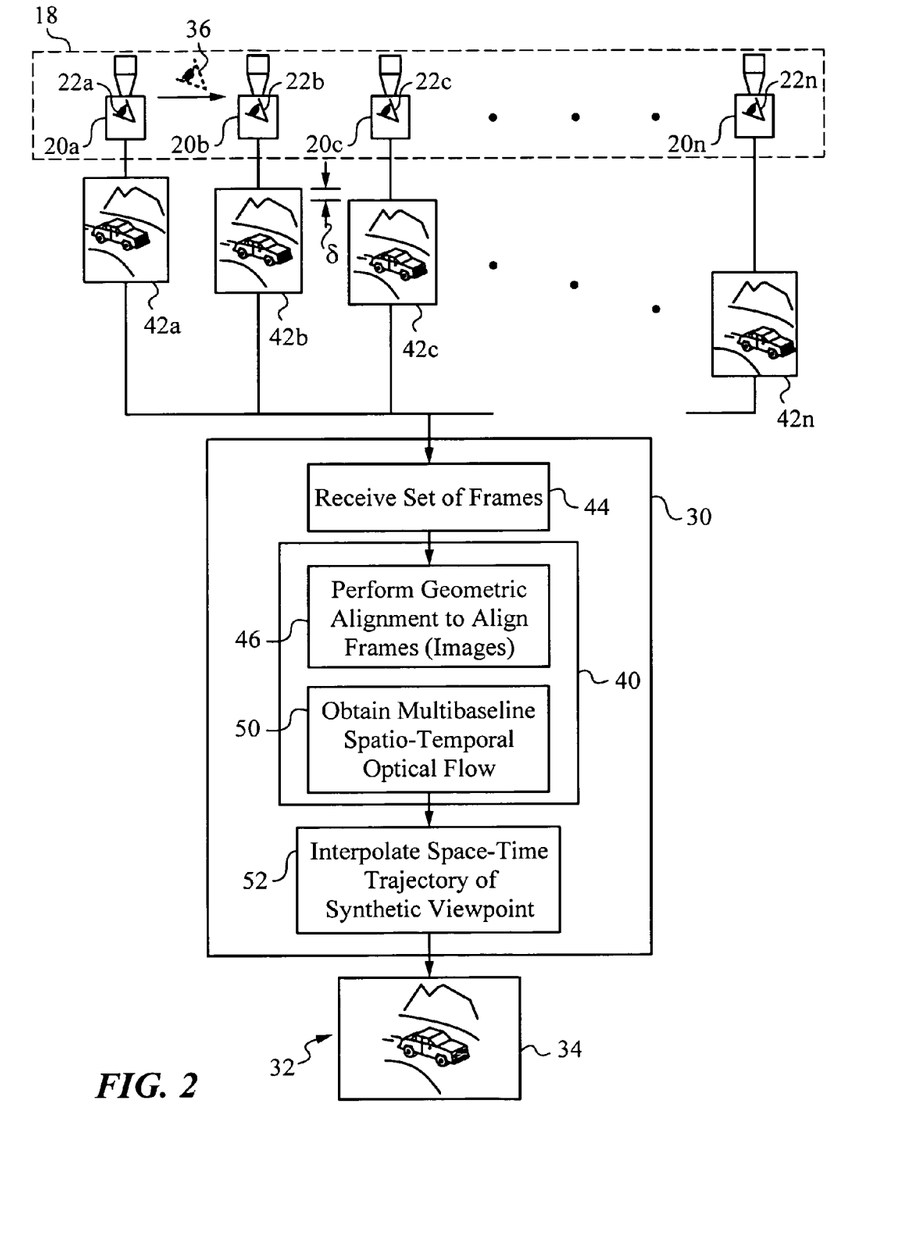
FIG. 2 is a diagram illustrating the processing of a set of frames obtained by cameras of the array shown in FIG. 1.

The operation of processing unit 30 will be better understood by referring now to FIG. 2. Processing unit 30 is equipped with a spatio-temporal interpolation unit 40 for performing image-processing functions in accordance with the invention.

In the present embodiment, individual frames 42a, 42b, 42c, ..., 42n constituting set of frames 42 captured in linearly staggered fashion by cameras 20a, 20b, 20c, ..., 20n during a cycle T is sent to processing unit 30. In unit 30, set of frames 42 offset by regular inter-frame delay δ is received by a frame receiver 44. From receiver 44 set of frames 42 is sent to a geometric alignment module 46 of spatio-temporal interpolation unit 40.

Geometric alignment is used in creating visual output 32 to align the images or frames 42 from cameras 20 to a reference view. Since cameras 20 have different centers of projection there is parallax, as mentioned above. To solve this problem, it is advantageous to make the assumption that scene 12 lies within a shallow depth of a single object plane. In particular, for our region of interest 11 we use object plane 13 containing car 16. Of course, this condition holds when scene 12 is either relatively flat or sufficiently distant from array 18 relative to the spacings between cameras 20.

In one embodiment a planar calibration target (not shown) is placed at object plane 13. Then a central camera, e.g., camera 20i, is chosen to provide a reference view. The point correspondence between features from that reference view and views from other cameras 20 are used to compute the 2D homography for each of the other cameras 20. This transformation effectively rectifies all of the views from cameras 20 to a common plane, and then translates them such that objects on that plane are aligned.

Figure 3:
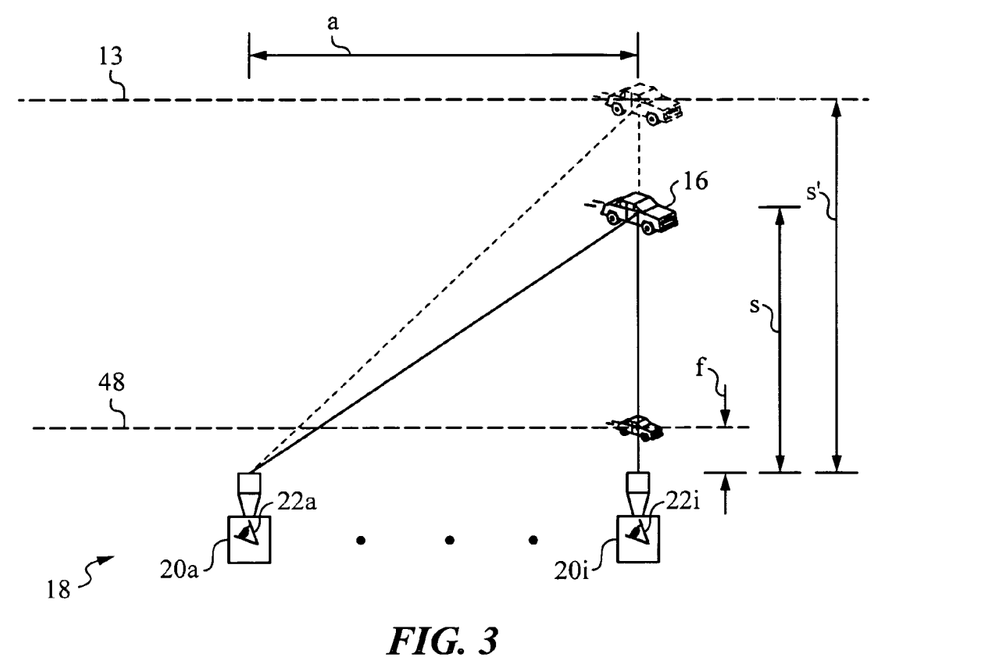
FIG. 3 is a diagram illustrating a geometric alignment procedure using a projective transform to align the images or frames obtained from the cameras of the apparatus shown in FIG. 1.

FIG. 3 shows the alignment error as an object, such as car 16 strays from object plane 13. In this analysis it is assumed that array 18 is located in a single plane, that the optical axes of cameras 20 are parallel, and that focal lengths f of all cameras 20 are the same and therefore define a common image plane 48. Thus, for reference camera 20i separated from camera 20a by a distance a there is a disparity d that can be expressed as:

$$d = \frac{fa}{s}$$

between images of frames 40a and 40i in the standard perspective camera model. The computed homography accounts exactly for that disparity d and variations in f when registering the two views. If object 16 were actually at a distance s' instead of s, then the resulting disparity d is:

$$d' = \frac{fa}{s'}.$$

The difference between disparities d and d' is our error in metric units, not pixels at image plane 48. Note that the difference between predetermined, fixed viewpoint and a moving viewpoint is typically chosen after the fact.

Equating the maximum tolerable error c to the difference between d and d', and solving for s' yields the equation:

$$s' = \frac{s}{1 - \frac{sc}{fa}}.$$

Evaluating this for positive and negative maximum errors gives our near and far effective focal limits. This is the same equation used to calculate the focal depth limits for a pinhole camera with a finite aperture. For more information on this subject the reader is referred to R. Kingslake, Optics in Photography, SPIE Optical Engineering Press, copyright 1992. In this instance, our aperture is the area spanned by our camera locations. Rather than becoming blurry, objects off focal plane 48 remain sharp but appear to move around from frame to frame 42 in the aligned images.

Returning now to FIG. 2, in a particular embodiment the geometric alignment may or may not be performed, and images of frames 42 are sent to an optical flow processor 50 for computing a multibaseline spatio-temporal optical flow in region of interest 11. Because of reduced image motion between captured frames 42 decreases the complexity or increases the robustness of other interpolation methods. The combination of dense camera array 18, improved spatio-temporal sampling, and plane plus parallax calibration allows us to compute new views robustly using optical flow.

In the preferred embodiment, the optical flow method applied by processor 50 is modified from the Black and Anandan 1993 method known in the art. The present modification to the spatio-temporal optical flow has two novel features. First, we solve for a flow field at the (x,y,t) location of desired synthetic viewpoint 36. Specifically, (x,y) is the location of viewpoint 36 in the plane of cameras 20 and t is the time of view (the time the frame is captured). Typically, optical flow methods compute flow between two images by iteratively warping one towards the other. In accordance with the invention, processor 50 extends the known bi-directional flow to compute flow at a desired view in our normalized (x,y,t) view space. This is done by iteratively warping the nearest four captured images toward the virtual view and minimizing the weighted sum of the robust pairwise data errors and a robust smoothness error.

Motion cannot be modeled consistently for four images at different space-time locations using just horizontal and vertical image flow. Therefore, the second component of the optical flow method of the invention is simultaneously accounting for parallax and temporal motion. To accomplish this processor 50 decomposes the optical flow into two components. The first component is the two-dimensional flow or scene motion per pixel, and the second component is a scene depth per pixel, which is a term for relative depth that accounts for parallax between views. This plane plus parallax calibration produces the relative displacements of all cameras 20, and we know that the parallax between any two views is the product of their displacement and the point's relative depth.

The standard intensity constancy equation for optical flow is:

$$I(i,j,t) = I(i+u\delta t, j+v\delta t, t+\delta t),$$

where (i,j,t) represent the pixel image coordinates and time, and u and v are the horizontal and vertical motion at an image point. The choice of i and j in place of x and y is made to avoid confusion with view coordinates (x,y,t).

The modified intensity constancy equation according to the invention includes new terms to handle parallax. It represents constancy between a desired virtual view and a nearby captured image at some offset (d$\delta$s,d$\delta$y,d$\delta$t) in space of source images. It accounts for the relative depth, d, at each pixel as well as the temporal flow (u,v):

$$I_{virtual}(i,j,x,y,t) = I_{source}(+u\delta t, j+v\delta t, t+\delta t).$$

The optical flow is computed by processor 50 from four images from the tetrahedron that encloses the desired view in the Delauney triangulation. The images are progressively warped toward the common virtual view at each iteration of the algorithm. Rather than testing the intensity constancy equation for each warped image against a virtual view, we instead minimize the error between the four warped images themselves, using the sum of pairwise robust intensity constancy error estimators. This produces a single optical flow map, which can be used to warp the four source images to the virtual view.

In the last step, the aligned and corrected sequence of frames is sent to a module 52 that interpolates a desired space-time trajectory of synthetic viewpoint 36. Then, the final high-speed video 32 obtained from processing unit 30 is displayed on display 34.

Figure 4:
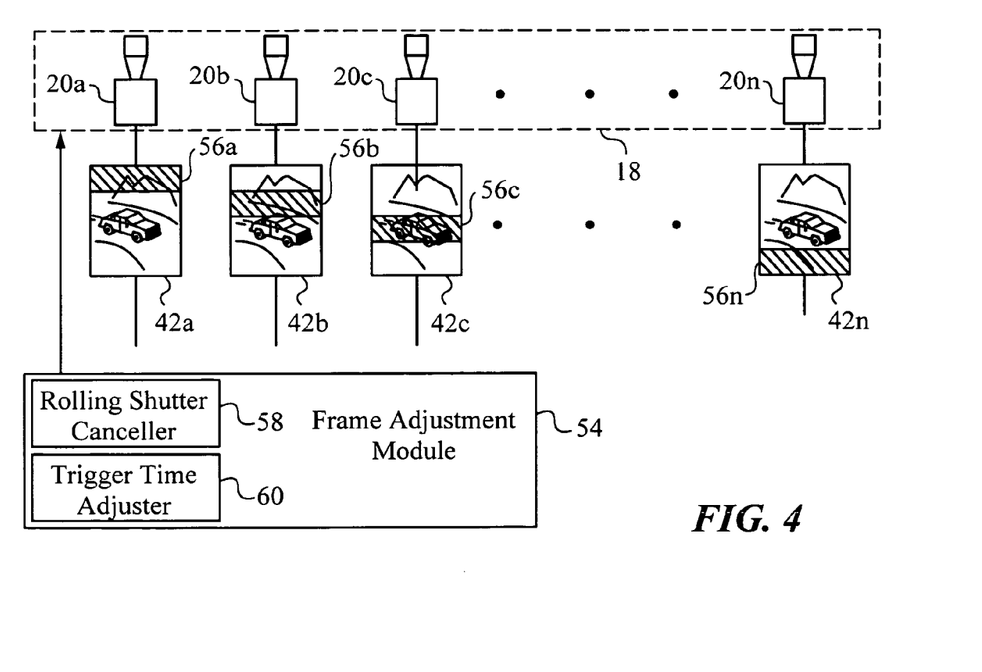
FIG. 4 illustrates a module for rolling shutter cancellation.

A number of desirable adjustments can be made to the visual output of the apparatus of invention. In one particular embodiment apparatus 10 has a frame adjustment module 54 for controlling or correcting the mechanics of frame capture by cameras 20 of array 18 as shown in FIG. 4.

In the specific embodiment, where cameras 20 have a rolling shutter, frame adjustment module 54 has a rolling shutter canceller 58 for eliminating that effect. Canceller 58 removes the rolling shutter effect by staggering the triggering of cameras 20 evenly, so at any time they are imaging different regions 56 of object plane 13 as illustrated. Specifically, camera 20a is triggered to image region 56a, camera 20b is triggered to image region 56b and so on, as illustrated in FIG. 4. In the present embodiment regions 56 are a set of horizontal pixel lines that are captured at the same time t. Of course, other partitioning of the image, e.g., into vertical pixel lines or other portions that add up to produce a complete image are also possible. These regions are then stacked by module 54 into one image in which the rolling shutter effect is cancelled.

In another specific embodiment, the frame adjustment module has a frame timing adjuster 60 to perform additional corrections of triggering times. This can be done in order to adjust the values of $\delta$ from camera to camera or for other functions.

Figure 5:
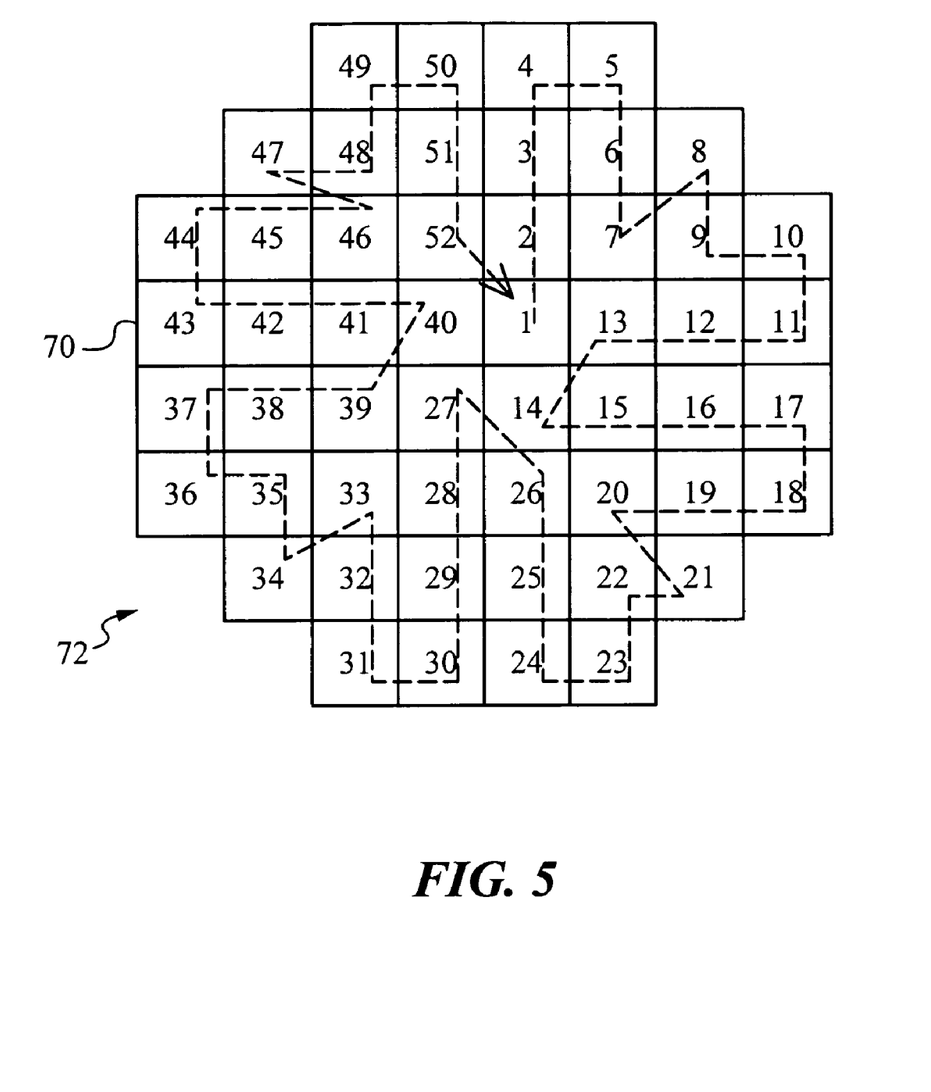
FIG. 5 illustrates a two-dimensional array of cameras with a staggered frame capture sequence according to the invention.

FIG. 5 illustrates an alternative arrangement of cameras 70 in a two-dimensional array 72. In this embodiment the number of cameras is 52 (n=52), and the staggering sequence is indicated in a dashed line. This staggering sequence ensures that successive frames are obtained from neighboring cameras 70, thereby rendering the arrangement advantageous in applications where the visual output is a high-speed video that appears to the viewer to be taken from the same synthetic viewpoint.

It should be noted that the spatio-temporal interpolation allows the operator to select synthetic viewpoint to move along any desired space-time trajectory including points that correspond to virtual space-time points as well as space time points that correspond to actual viewpoints of the cameras.

The invention provides many advantages. First, it provides a system for capturing video of real, dynamic scenes with high temporal resolution (frame rate) using multiple, precisely-timed video cameras, and methods to process and use the video data. Two specific applications are high-speed videography and spatiotemporal view interpolation. In one embodiment, a system includes the capture system, a method for overcoming artifacts due to rolling shutters (also known as scanning shutters), and a new multibaseline spatiotemporal optical flow algorithm that uses the known geometric and temporal relationship between cameras to create new space-time views from the set of captured images.

For a camera of a given frame rate, s, one aspect of the invention provides a method to capture video at a higher effective frame rate h by using multiple cameras. More specifically, for an array of cameras such as those commonly used for view interpolation, the scene can be sampled more efficiently in time without increasing the frame rate of the cameras or the amount of recorded data. In both cases, frequency-locked cameras are configured to trigger with varying user-selected phase delays relative to each other. Technically, such an array is synchronized with phase offsets. We shall normally refer to this as 'staggered'. We normally refer to cameras that are frequency-locked and configured to trigger at the same time as 'synchronized'. Although a primary application of the system is to capture data with higher temporal resolution using staggered cameras, some aspects (such as the multibaseline spatiotemporal optical flow) are useful in applications for synchronized camera arrays.

For a practical system, the invention provides several aspects that are preferably practiced together:

1. The multiple camera array architecture. The general system architecture described earlier is enhanced to include the feature that specifically enables all of the following applications: precise timing control over the cameras.
2. High-speed videography using dense camera arrays. We show how to combine data from many lower-speed video cameras to create a single, high-speed video. As part of this, we address how to correct artifacts resulting from the electronic rolling shutter, a common feature of low-cost image sensors.
3. Spatio-temporal view interpolation using dense camera arrays. Spatiotemporal view interpolation refers to capturing many images of a real, dynamic scene and creating synthetic views from virtual camera locations and times not in the captured set. Capturing video from many viewpoints using synchronized cameras with staggered trigger times enables spatiotemporal view interpolation with simple, image-based algorithms that do not require taking extra pictures. As part of this, we present a multibaseline spatiotemporal optical flow algorithm for interpolating new space-time views.

It should also be noted that the particular implementation of global signals (clock and trigger) uses a binary tree routing topology. Each camera receives these signals from a parent, buffers them, and sends them on to up to two children. This implementation is modular and scalable. By contrast, cameras that use synchronization inputs instead of programmable delays require separate, shifted synch inputs for each camera. This is one reason why prior art camera synchronization methods do not scale well to large numbers of cameras.

This system and method of high-speed video capture can continuously stream high-speed video to disk for minutes because the cameras compress their output in parallel. Streaming compressed data means less storage space is needed to capture the video. Compressed data also reduces the instantaneous bandwidth to disk or memory that the system must support, resulting in less expensive and complex implementations. In our case, this means we can stream using commodity hardware. Recording longer datasets eliminates the need to synchronize video capture with the event of interest. Typical high-speed cameras are limited to small capture durations, and synchronization is needed to ensure that the event of interest actually occurs during that short recording duration. Finally, our high-speed multiple-camera method can be combined with other multiple-camera applications.

Some of the possible extensions or variations of the system and method for high-speed video capture are as follows:

1. The high-speed method described above, implemented using cameras with a global snapshot instead of a rolling shutter.
2. Other forms of parallel video compression to compress the video data in real-time before it is sent to a storage device. For example, one could send raw video from a single high-speed camera to a compression device which would send every Nth frame to one of N MPEG compression units. This would be very analogous to our device without using separate cameras. Alternatively, one can send groups of sequential frames to separate video encoders. This would increase the temporal correlation between images within the group and would be a good strategy for MPEG encoding, if each group corresponded to an MPEG GOP (group of pictures).
3. Better alignment methods. One example is to use the spatiotemporal optical flow described in the spatiotemporal interpolation paper to align the images. For this, the sampling pattern should favor the spatiotemporal optical flow algorithm. One example pattern for a 3×3 array is in the spatiotemporal sampling paper.
4. The high-speed video application (with global or rolling shutters) with several cameras triggering at the same time in order to capture multiple views of the same high-speed scene. If sets of N cameras trigger at the same time, this reduces the frame rate by a factor of N, but allows the use of computer vision methods to deduce depth from stereo or multiple views and improve the image alignment. It also collects N times as much light at each instant. Low light levels are often a limiting factor for high-speed (and thus short exposure time) imaging.
5. In general, the combination of staggered camera triggers with any other multiple-view algorithms in order to more optimally sample temporally. The spatiotemporal view interpolation application we describe is just one example. Other potential target applications include synthetic aperture imaging, multicamera applications for super-resolution or high dynamic range, and others.

Yet another aspect of the invention provides techniques for spatiotemporal sampling and interpolation. Three novel features of our system for spatiotemporal view interpolation are:

1. Using an array of cameras with staggered trigger times to acquire video for spatiotemporal view interpolation. Staggered trigger times sample more efficiently temporally than an array synchronized to trigger at the same time.
2. Solving for optical flow for an image at a desired virtual viewing position in time and space, instead of solving for flow at pixels in captured images. This virtual space-time position is located between captured views in a three-dimensional space $(x,y,t)$, where $(x,y)$ is a camera spatial location and t is the time the image was acquired.
3. Using gradient-based optical flow methods to simultaneously solve for temporal image motion and parallax at a desired $(x,y,t)$ virtual view, given known viewing locations and times of our captured images; referred to as multibaseline spatiotemporal optical flow.

The fundamental advantage of the method of invention is a more optimal temporal sampling for arrays of cameras with a given frame rate. Capturing video with improved spatiotemporal sampling (due to staggered camera trigger times), enables the use of simpler methods to interpolate new space-time views.

The method of invention allows a director to film once, then create an arbitrary number of videos with different virtual spacetime trajectories. Rather than acquire the exact set of images for one space-time arc, we capture at uniformly spaced views in space and time, so that for a desired virtual viewpoint, the captured images come from nearby locations and times. The interpolation method then flows images together to create the desired views.

In contrast to the other prior art efforts to perform spatiotemporal view interpolation, the method of invention enjoys the advantage that it works purely in image space and does not explicitly compute scene models. It also does not require full geometric calibration, which is both computationally expensive and less robust than the plane and parallax method used herein. It uses only local image information, reducing the communication and computational demands of our methods. For example, it can use data from only four images to create a new view, while the prior art uses data from the entire array to create their models. This works because we can record the scene from many relatively closely-spaced viewpoints. Finally, the method can be used to process images of scenes that are hard to model. One example would be volumetric effects like smoke, flames, and so on in front of a uniform background.

In contrast to the prior art, the present multibaseline optical flow algorithm captures data using known camera locations and trigger times. This enables separation of the components of image motion between views into temporal scene motion and image motion due to parallax. Because we use plane+ parallax calibration, we have to compute only one component for parallax motion (essentially depth).

Note that the prior art, used bidirectional warping to solve for optical flow at a virtual viewpoint equidistant in time between two images in a video sequence. Our method extends this in non-obvious ways.

The prior art method warps two source views to an intermediate view in a one-dimensional (ordered by frame number) sequence. Choosing the nearby surrounding images to constrain the computed flow is trivial-you simply take the ones on either side of the desired view. The method of invention, by contrast, warps to a space-time location between captured views in a three-dimensional (x,y,t) space, where (x,y) is the location of a view, and (t) is when it was captured. Choosing the nearby images to constrain the warp is no longer trivial. One method is to use four nearby images forming a tetrahedron that contains the desired virtual view.

Because the prior art method uses only two source images, they can solve for just traditional two-component optical flow. At each pixel, they compute a vector (u,v) that tells the displacement from the pixel in their virtual view to the corresponding pixel in the source images. That method does not extend to more than two source images except under very constrained conditions, and does not distinguish between image motion due to camera parallax and image motion due to scene motion. The method of invention handles the general case of multiple source images at different locations and times by explicitly solving for both parallax and temporal motion.

There are many possible variations and modifications of the technique of the invention. For example:
1. The method can be directly used for view interpolation at one instant in time for an array of synchronized cameras using multibaseline optical flow. In this case, the temporal image motion is zero, and the virtual view and source images lie in a two-dimensional (x,y) subspace. One can solve for flow due only to parallax at a virtual (x,y) location, using nearby sources images that form a triangle enclosing the desired view. More source images could also be used.
2. The method can be extended to use more than three or four input images to constrain the multibaseline spatio-temporal optical flow.
3. One can use other methods to select nearby images to constrain the flow.
4. One can use a staggered camera array for improved temporal sampling for view interpolation.
5. One can use the spatial or spatiotemporal view interpolation method for real scenes which are hard to model physically, such as smoke, wild frizzy hair, or a motion blurred actor. By segmenting the partially transparent foreground from a background, and determinig the foreground's color and opacity, one can use the multibaseline optical flow algorithm to interpolate new views of the foreground. A simple way to do this is to take a static background image, then film the action and use standard background subtraction techniques. Alternatively, a green screen could be used. Then the two sets of images (the background, and the foreground video) can be interpolated independently and composited using the computed foreground alpha.

One example application would be video highlights of golfers, pitchers or similarly fast athletes with user control over the virtual camera location and frame rate, allowing normal speed or slow motion playback from continuously varying viewpoints.

The method is high-speed and single viewpoint and can be used to acquire the exact temporal information desired (short duration exposures and evenly staggered intervals). The method is computationally efficient and produces crisp, accurate images. The only uncertain delay in the system is the electrical signal propagation (buffering and speed-of-light delay), which for one hundred cameras (n=100) is less than 200 ns.

Many other embodiments of the apparatus and method of the invention are possible. Therefore, the scope of the invention should be judged by the appended claims and their legal equivalents.

We claim:
1. An apparatus for high speed video capture of a three-dimensional region of interest in a scene, said apparatus comprising:
   a) an array of video cameras for viewing said three-dimensional region of interest from a corresponding set of viewpoints, wherein each of said video cameras has a frame rate and a corresponding frame time, wherein said frame time is inversely related to said frame rate;
   b) a triggering mechanism for staggering in time the capture of a set of frames by said array of video cameras, wherein said video cameras are triggered in a sequence whereby temporally successive frames in said set of frames is captured by two or more different video cameras of said array of video cameras, wherein said staggering introduces a time delay between said successive frames, wherein said time delay is the delay between triggering two of said different video cameras, and wherein said time delay is less than said frame time of each of said video cameras; and
   c) a processing unit for combining and operating on said set of frames to generate a visual output having a synthetic viewpoint of said three-dimensional region of interest, wherein the processing unit solves for a flow field at a (x,y,t) location of the synthetic viewpoint in a (x,y,t) view space, wherein the processing unit decomposes an optical flow into a first component, being a scene motion per pixel, and a second component, being a scene depth per pixel, wherein said synthetic viewpoint is moveable in space and time, wherein said processing unit comprises a spatio-temporal interpolation unit for performing a spatio-temporal interpolation operation on said three-dimensional region of interest.

2. The apparatus of claim 1, wherein said visual output is a high-speed video of said three-dimensional region of interest.

3. The apparatus of claim 2, wherein said spatio-temporal interpolation unit calculates a space-time trajectory of said synthetic viewpoint.

4. The apparatus of claim 2, wherein said array of video cameras is a dense array of video cameras.

5. The apparatus of claim 1, wherein said visual output is a space-time structure and motion model of said three-dimensional region of interest.

6. The apparatus of claim 1, wherein said synthetic viewpoint is a virtual viewpoint interpolated in space-time by said spatio-temporal interpolation unit from said set of viewpoints.

7. The apparatus of claim 1, wherein said synthetic viewpoint corresponds to at least one viewpoint selected from said set of viewpoints.

8. The apparatus of claim 1, wherein said spatio-temporal interpolation unit further comprises an optical flow processor for obtaining a multibaseline spatio-temporal optical flow of said three-dimensional region of interest.

9. The apparatus of claim 8, wherein said multibaseline spatio-temporal optical flow comprises a scene depth per pixel and a scene motion per pixel.

10. The apparatus of claim 1, further comprising a frame adjustment module for controlling the frame capture of said array of video cameras.

11. The apparatus of claim 10, wherein said frame adjustment module comprises a rolling shutter canceller.

12. The apparatus of claim 10, wherein said frame adjustment module comprises a frame timing adjuster.

13. The apparatus of claim 1, wherein said synthetic viewpoint moves according to said triggering sequence.

14. A method of capturing high speed video of a three-dimensional region of interest in a scene, said method comprising:
   a) positioning an array of video cameras for viewing said three-dimensional region of interest from a corresponding set of viewpoints, wherein each of said video cameras has a frame rate and a corresponding frame time, wherein said frame time is inversely related to said frame rate;
   b) staggering in time the capture of a set of frames by said array of video cameras, wherein said video cameras are triggered in a sequence whereby temporally successive frames in said set of frames is captured by two or more different video cameras of said array of video cameras, wherein said staggering introduces a time delay between said successive frames, wherein said time delay is the delay between triggering two of said different video cameras, and wherein said time delay is less than said frame time period of each of said video cameras;
   c) combining said set of frames;
   d) operating on said set of frames to generate a visual output having a synthetic viewpoint of said three-dimensional area of interest, wherein said operating comprises solving for a flow field at a (x,y,t) location of the synthetic viewpoint in a (x,y,t) view space, wherein said operating comprises decomposing an optical flow into a first component, being a scene motion per pixel, and a second component, being a scene depth per pixel, wherein said synthetic viewpoint is moveable in space and time; and
   e) spatio-temporally interpolating said visual output.

15. The method of claim 14, wherein said spatio-temporal interpolation comprises obtaining of a multibaseline spatio-temporal optical flow.

16. The method of claim 14, wherein said spatio-temporal interpolation comprises obtaining a spatio-temporal trajectory of said synthetic viewpoint.

17. The method of claim 14, wherein said visual output is a space-time structure and motion model of said three-dimensional region of interest.

18. The method of claim 14, wherein said staggering comprises delivering a trigger signal and a clock signal to said video cameras belonging to said array of video cameras.

19. The method of claim 14, wherein said time delay is programmed in each of said video cameras belonging to said array of video cameras.

20. A method of capturing high speed video of a three-dimensional region of interest in a scene, said method comprising:
   a) positioning an array of video cameras for viewing said three-dimensional region of interest from a corresponding set of viewpoints, wherein each of said video cameras has a frame rate and a corresponding frame time, wherein said frame time is inversely related to said frame rate;
   b) staggering in time the capture of a set of frames by said array of video cameras, wherein said video cameras are triggered in a sequence whereby temporally successive frames in said set of frames is captured by two or more different video cameras of said array of video cameras, wherein said staggering introduces a time delay between said successive frames, wherein said time delay is the delay between triggering two of said different video cameras, wherein said time delay is less than said frame time period of each of said video cameras, and wherein said time delay between triggering said different video cameras is a predetermined user-selected phase delay $\Delta$ programmed into each of the video cameras;
   c) combining said set of frames;
   d) operating on said set of frames to generate a visual output having a synthetic viewpoint of said three-dimensional area of interest, wherein said operating comprises solving for a flow field at a (x,y,t) location of the synthetic viewpoint in a (x,y,t) view space, wherein said synthetic viewpoint is moveable in space and time; and
   e) spatio-temporally interpolating said visual output.

* * * * *

UNITED STATES PATENT AND TRADEMARK OFFICE
CERTIFICATE OF CORRECTION

PATENT NO.        : 8,027,531 B2
APPLICATION NO.   : 11/187699
DATED             : September 27, 2011
INVENTOR(S)       : Bennett Wilburn It is certified that error appears in the above-identified patent and that said Letters Patent is hereby corrected as shown below:

In the Specification

The STATEMENT OF GOVERNMENT SPONSORSHIP paragraph appearing at col. 1, lines 14-18, should read as follows:

This invention was made with Government support under contract F29601-01-2-0085 awarded by the Air Force, under contract NBCH1030009 awarded by the Defense Advanced Research Projects Agency, and under contract 0219856 awarded by the National Science Foundation. The Government has certain rights in the invention.

Signed and Sealed this
Twenty-ninth Day of September, 2015

Michelle K. Lee
*Director of the United States Patent and Trademark Office*